US006328181B1

(12) United States Patent
Schroeder et al.

(10) Patent No.: US 6,328,181 B1
(45) Date of Patent: Dec. 11, 2001

(54) ENHANCED FLOW CONTROLLER FOR A BEVERAGE DISPENSER

(75) Inventors: Alfred A. Schroeder; John D. Santy, Jr., both of San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 09/496,441

(22) Filed: Feb. 2, 2000

(51) Int. Cl.[7] ........................................................ B67D 5/56
(52) U.S. Cl. ........................ 222/129.1; 222/396; 222/397
(58) Field of Search ................................ 222/1, 2, 3, 4, 222/61, 129.1, 396, 397

(56) References Cited

U.S. PATENT DOCUMENTS

| | | | | |
|---|---|---|---|---|
| 3,653,548 | * | 4/1972 | Kotscha et al. | 222/129.1 |
| 3,902,636 | * | 9/1975 | Zilk | 222/129.1 |
| 4,226,344 | * | 10/1980 | Booth et al. | 222/504 |
| 4,535,917 | * | 8/1985 | Trewhella | 222/129.1 |
| 4,741,355 | * | 5/1988 | Credle, Jr. et al. | 137/269 |
| 5,607,083 | * | 3/1997 | Vogel et al. | 222/129.1 |
| 5,685,458 | * | 11/1997 | Durham et al. | 222/129.1 |

* cited by examiner

Primary Examiner—Kevin Shaver
Assistant Examiner—Melvin A Cartagena
(74) Attorney, Agent, or Firm—Christopher L. Makay

(57) ABSTRACT

A modular flow controller for controlling fluid flow, including a flow control assembly for establishing a desired flow rate. The flow control assembly includes a flow adjustment interface rendered in a substantially horizontal position for receiving a control input to establish a flow rate. The modular flow control assembly includes a valve assembly in operational engagement with the flow control assembly for discharging a desired quantity of fluid from the modular flow controller. The modular flow controller is preferably applied to a beverage dispenser's dispensing valve assembly, wherein the dispensing valve assembly includes a faucet plate. Accordingly, due to the configuration of the modular flow controller, it is unnecessary to secure the modular flow controller to the faucet plate for operation thereof. The modular flow controller includes a drink integrity locking unit for preventing access to a flow adjustment interface. The modular flow controller may include a back block interface element for linking the modular flow controller to a back block. The modular flow controller may include a fitting lock for a fluid carrying element, such as standard fittings, couplings as well as beverage fluid lines. The fitting lock, in turn, includes a body and a sliding element in cooperative engagement with the body for securing the fluid carrying element to the body. The modular flow controller may include a coil assembly to restrict fluid flow. The coil assembly, in turn, includes an actuator retainment lip extending outwardly for supporting an actuator element within a plunger chamber.

19 Claims, 8 Drawing Sheets

ENHANCED FLOW CONTROLLER FOR A BEVERAGE DISPENSER

BACKGROUND OF THE INVENTION

1. Field of the Invention

The present invention generally relates to dispensing equipment and, more particularly, but not by way of limitation, to an improved flow controller for regulating beverage fluid flow associated with a beverage dispenser.

2. Description of the Related Art

A standard post-mix beverage dispenser mixes beverage fluids to formulate a beverage. In particular, a supply of concentrate, such as beverage flavored syrup for soft drinks, is mixed with a supply of diluent, such as plain or carbonated water. The concentrate and the diluent are usually dispensed simultaneously through a dispensing nozzle of a dispensing valve assembly so that a desired beverage is both mixed and dispensed therefrom typically into a cup. Thus, each beverage fluid is brought from a beverage fluid source, across a beverage dispenser to the dispensing valve assembly via a beverage fluid line. Similarly, standard pre-mix beverage dispensers bring a desired beverage from a pre-mixed beverage source across a beverage dispenser to the dispensing valve assembly for discharge by a dispensing nozzle.

Generally, for pre-nix and post-mix beverage dispensers, a dispensing valve assembly includes a faucet plate having at least one flow aperture extending through the faucet plate, a top surface, and a bottom surface whereby the dispensing nozzle is operatively linked with the bottom surface. Typically, the faucet plate is horizontally aligned with the ground to facilitate gravitationally-aided discharge into a cup below. A flow controller, linked and in fluid communication with a beverage fluid line, is attached to the top plate so that beverage fluid flows from the flow controller across the flow aperture through the dispensing nozzle. In effect, the flow controller controls the quantity and rate of beverage fluid flow discharged by the dispensing valve assembly.

The flow controller, in turn, is typically operationally divided into a flow control assembly and a valve assembly in operational engagement with the flow control assembly. The flow control assembly is linked with and receives beverage fluid from the beverage fluid line, thereby optimally adjusting the flow rate of the beverage fluid so that a favorable drink is discharged from the dispensing nozzle. The valve assembly is operatively engaged with the dispensing nozzle and permits a desired quantity of beverage fluid to pass from the dispensing valve assembly to the dispensing nozzle.

By maintaining consistent concentrate and diluent flow rates with varying flow pressures, flow control assemblies in post-mix beverage dispensers ensure that a proper mixture ratio between concentrate and diluent is provided. A proper mixture ratio is essential for a dispenser to serve beverages with consistent quality and taste. Unfortunately, current flow control assemblies routinely require manual recalibration in that they drift out of proper adjustment during the course of time. Drink integrity is thus compromised when flow control assemblies are improperly calibrated, especially by those who are not trained service technicians.

Current flow control assemblies as well as valve assemblies are each secured directly onto the top surface of the faucet plate. In addition, it is well known in the industry to link back blocks with dispensing valve assemblies such that the back blocks are secured onto the top of the faucet plate as well. Back blocks ensure that fluid pressure is maintained along a beverage fluid line while a dispensing valve assembly is removed, especially during cleaning or maintenance. Inasmuch, the size of a faucet plate is unfavorably increased to accommodate the back block as well as the flow control and valve assemblies. Whereas beverage dispensers must compete for commercially valuable horizontal shelf space with other commercial drink service related products, there exists a great need in the beverage dispenser industry to minimize the overall size of the faucet plate.

Accordingly, there is a long felt need for a flow controller that is space saving as well as maintaining favorable drink integrity.

SUMMARY OF THE INVENTION

In accordance with the present invention, a modular flow controller for controlling fluid flow, including a flow control assembly for establishing a desired flow rate. The flow control assembly includes a flow adjustment interface rendered in a substantially horizontal position for receiving a control input to establish a flow rate. The modular flow control assembly includes a valve assembly in operational engagement with the flow control assembly for discharging a desired quantity of fluid from the modular flow controller. The modular flow controller includes a manifold for operatively linking the flow control assembly and the valve assembly.

The modular flow controller is preferably applied to a beverage dispenser's dispensing valve assembly. As such, the beverage dispenser is a beverage dispenser of a type well known in the industry. The beverage dispenser includes a dispensing nozzle for discharging a desired beverage and a faucet plate for supporting the dispensing nozzle. The beverage dispenser includes a beverage fluid line for delivering beverage fluids to the modular flow controller. Beverage fluid thus flows from the beverage fluid line across the modular flow controller in engagement with the dispensing valve assembly to the dispensing nozzle operatively linked to the dispensing valve assembly.

Accordingly, the flow control assembly includes a flow control unit operatively linked and in fluid communication with the beverage fluid line. The flow control unit establishes a consistent beverage fluid flow rate amid varying flow pressures exerted by beverage fluid received from the beverage fluid line. Similarly, it must also be said that the valve assembly includes an inductor unit for restricting fluid flow from the modular flow controller.

The manifold includes a manifold inlet in fluid communication with the beverage fluid line for enabling the modular flow controller to operate apart from the faucet plate. The manifold inlet is configured to accommodate a fluid carrying element such as such as standard fittings, couplings as well as beverage fluid lines, whereby the fluid carrying element is in fluid communication with the manifold inlet. It should also be said that the manifold inlet can be configured to accommodate a back block.

In a similar manner, the manifold includes manifold outlet in fluid communication with the beverage fluid line for enabling the modular flow controller to operate apart from the faucet plate. The manifold outlet is configured to accommodate a fluid carrying element, whereby the fluid carrying element is in fluid communication with the manifold outlet.

The flow control assembly further includes a drink integrity locking unit in cooperative engagement with the flow control unit, whereby the drink integrity locking unit limits access to the flow control unit. The drink integrity locking unit includes a drink integrity coupling for engagedly receiving the flow adjustment interface and a drink integrity lock operatively linked with the drink integrity coupling so that the drink integrity lock prevents access to the flow adjustment interface.

In particular, the flow adjustment interface includes an adjustment slot for receiving a control input thereon to, thus, adjust the flow adjustment interface. The drink integrity lock covers the adjustment slot from view, thereby preventing access to the flow adjustment interface.

In accordance with the present invention, a fitting lock for a fluid carrying element, includes a body and a sliding element in cooperative engagement with the body for securing the fluid carrying element to the body. The fitting lock may further include a back block interface element extending from the body for securing the fluid carrying element to a back block, thereby enabling the fluid carrying element and the back block to operate in tandem and apart from the faucet plate.

The sliding element is renderable in a first position for abutting the fluid carrying element, thereby securing the fluid carrying element. The sliding element includes an abutting aperture so dimensioned that, in the first position, the fluid carrying element is in frictional engagement with the abutting aperture.

The sliding element is renderable in a second position for freeing the fluid carrying element. The sliding element includes a freeing aperture so dimensioned that, in a second position, the fluid carrying element passes freely therethrough.

Moreover, the sliding element may be rendered in a third position, whereby the sliding element is removed from the body. As such, the fitting lock further includes a holding rib disposed on the body and a holding groove disposed on the sliding element in cooperative engagement with the holding rib. In the third position, the holding rib is forced out from the holding groove, thereby releasing the sliding element from the body.

In accordance with the present invention, a coil assembly for an inductor unit, includes a coil element The coil element, in turn, includes a plunger chamber extending along the coil element and an actuator interface member operatively linked to the plunger chamber. The actuator interface member favorably positions the actuator element within the plunger chamber.

The coil assembly further includes an actuator retainment lip extending outwardly from the actuator element for supporting the actuator element within the plunger chamber. Moreover, the actuator interface member includes a retainment groove for engagedly receiving the actuator retainment lip, thereby favorably positioning the actuator element in the plunger chamber.

In accordance with the present invention, a method for controlling fluid flow, includes forming a flow controller, whereby the flow controller includes a valve assembly and a flow control assembly. The valve assembly is operatively linked with the flow control assembly. The flow adjustment interface of the flow control assembly is rendered in a substantially horizontal position. Fluids are then passed through the flow controller. A control input is submitted on the flow adjustment interface and a desired flow rate is established for fluid passing through the flow control assembly via the control input. As a result, a desired quantity of fluid from the flow controller is discharged via the valve assembly.

In accordance with the present invention, a method for securing a fluid carrying element, includes linking a sliding element in cooperative engagement with a body. A fluid carrying element is then secured to the body via the sliding element. As discussed above, the sliding element is then rendered in a first, a second, or a third position.

In accordance with the present invention, a method for operating an inductor unit, includes providing a coil element and forming a plunger chamber along the coil element. An actuator interface member is then operatively linked to the plunger chamber. An actuator element is then provided and an actuator retainment lip, extending outwardly from the actuator element, is formed. The actuator element is then positioned within the plunger chamber via the interface member.

It is therefore an object of the present invention to provide a modular flow controller and associated method for controlling fluid flow.

It is a further object of the present invention to configure the modular flow controller so that it is unnecessary to secure the modular flow controller to a beverage dispenser faucet plate for operation thereof It is a further object of the present invention to provide a drink integrity locking unit and associated method for preventing access to a flow adjustment interface.

It is a further object of the present invention to provide a fitting lock and associated method for engagement with a fluid carrying element.

It is a further object of the present invention to provide a back block interface element and associated method for linking a modular flow controller to a back block.

It is still a further object of the present invention to provide an actuator retainment lip of a flow controller coil assembly and associated method for supporting an actuator element within a plunger chamber.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein, however, it is to be understood that the disclosed embodiments are merely exemplary of the invention which may be embodied in various form, the figures are not necessarily to scale, and some features may be exaggerated to show details of particular components or steps.

Figure 1:
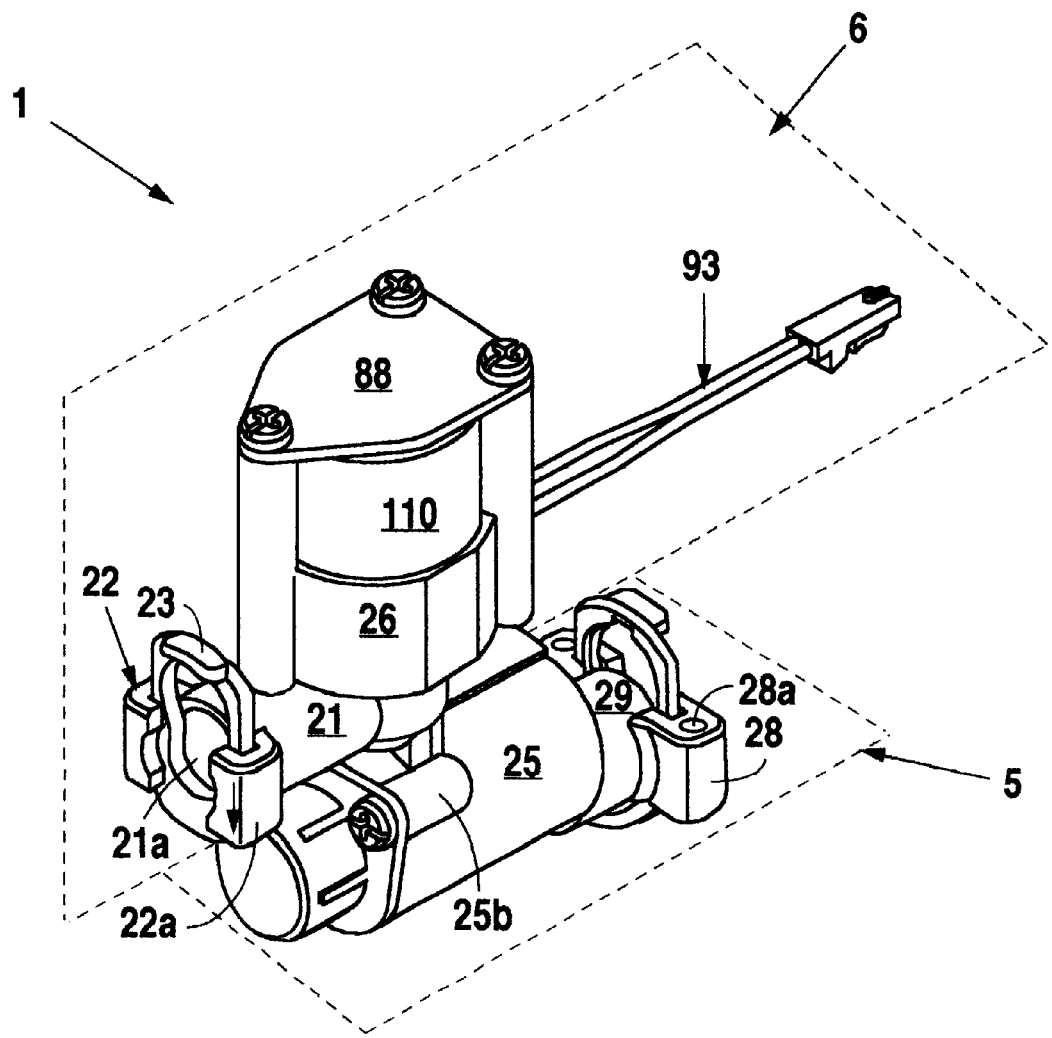
FIG. 1 is an isometric view illustrating a modular flow controller according to the preferred embodiment that is space saving and maintains favorable drink integrity.
Figure 2:
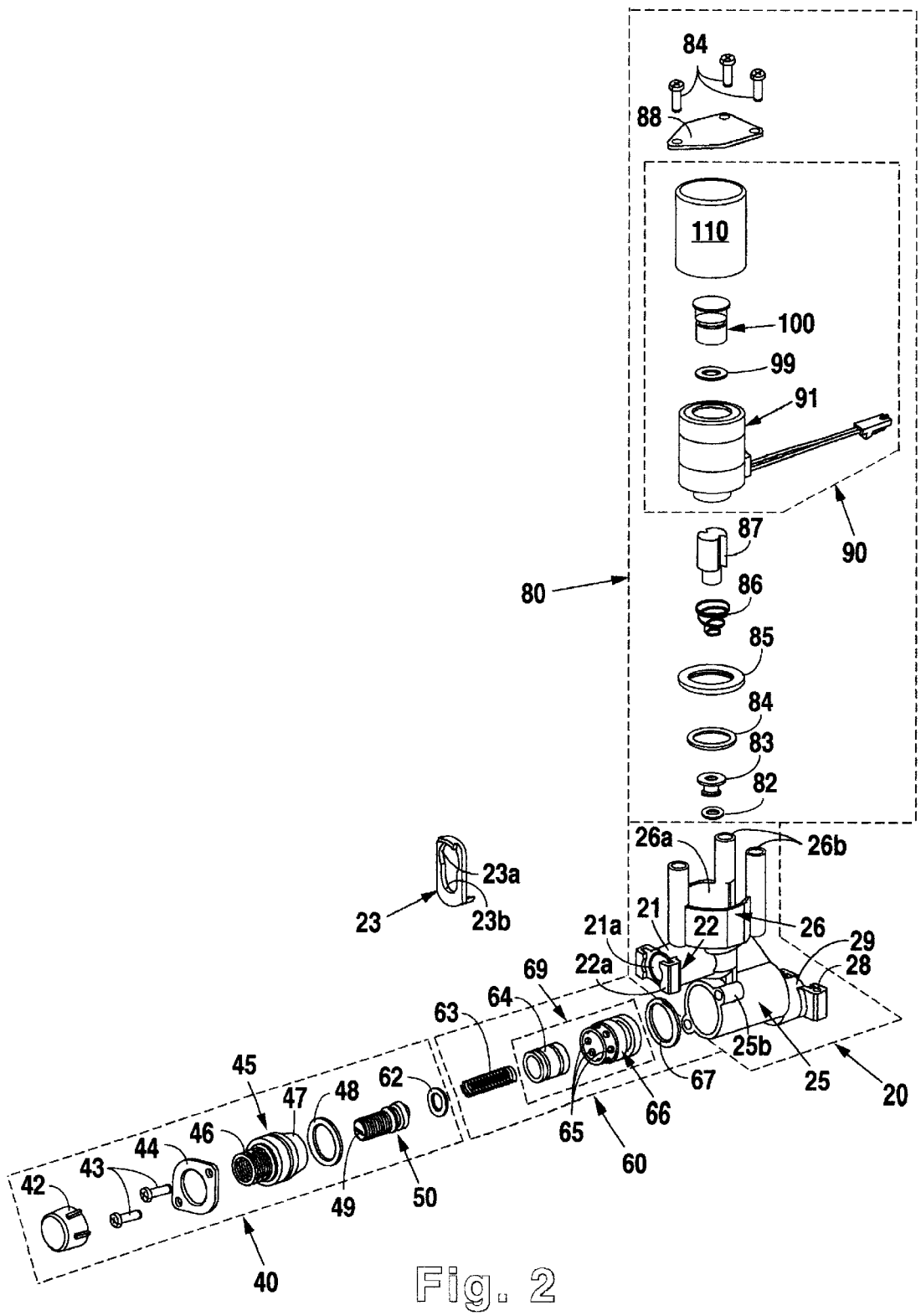
FIG. 2 is an exploded view illustrating the modular flow controller of FIG. 1.

FIGS. 1 and 2 illustrate a modular flow controller 1 as is preferred for a beverage dispenser dispensing valve assembly (not shown) that is space saving while maintaining favorable drink integrity. As such, the modular flow controller 1 is contemplated for use with a well known beverage dispenser dispensing valve assembly.

Specifically, the dispensing valve assembly includes a dispensing nozzle for discharging a desired beverage therefrom to a consumer. The dispensing valve assembly includes a beverage fluid line for delivering beverage fluids, such as post-mix concentrate, post-mix diluent, or pre-mix beverage fluids, from a respective beverage fluid source to the dispensing valve assembly and, ultimately, for discharge by the dispensing nozzle.

The dispensing valve assembly further includes a faucet plate having at least one flow aperture extending through the faucet plate, a top surface, and a bottom surface, whereby the dispensing nozzle is operatively linked with the flow aperture at the bottom surface. Preferably, the faucet plate is horizontally aligned with the ground to facilitate gravitationally-aided discharge to a consumer.

Accordingly, the modular flow controller 1, in general, is linked and in fluid communication with a beverage fluid line so that the modular flow controller 1 receives beverage fluid from the beverage fluid line. Generally, the modular flow controller 1 is positioned above the top surface of the faucet plate so that fluid discharged from the modular flow controller 1 passes through the flow aperture to the dispensing nozzle. In short, the modular flow controller 1 controls the quantity and rate of beverage fluid flow discharged by the dispensing valve assembly. It should also be said that, unlike current flow controllers that are secured directly onto the top surface of the faucet plate, the modular flow controller 1 is configured to minimize or eliminate the need for direct contact with the faucet plate, thereby favorably reducing the overall size of the faucet plate.

Inasmuch, as shown in FIG. 1, the modular flow controller 1 is preferably divided into two portions: a flow control assembly 5 and a valve assembly 6 in operational engagement with the flow control assembly 5. Generally, the flow control assembly 5 is operatively linked with and receives beverage fluid from the beverage fluid line, thereby optimally adjusting the flow rate of the beverage fluid so that, ultimately, a favorable drink is discharged from the dispensing nozzle. The valve assembly 6 is operatively engaged with the dispensing nozzle and, thus, permits a desired quantity of beverage fluid to pass from the dispensing valve assembly to the dispensing nozzle.

In FIG. 2, the flow control assembly 5 is further divided into a drink integrity locking unit 40 and a flow control unit 60 linked and in cooperative engagement with the drink integrity locking unit 60. Generally, the flow control unit 60 maintains a consistent beverage fluid flow rate amid varying flow pressures exerted by the beverage fluid as it is received from the beverage fluid line. It is important that the modular flow controller 1 establish a favorable flow rate when channeling beverage fluid to the dispensing nozzle in that a proper flow rate is essential for a beverage dispenser to properly serve beverages with consistent quality and taste. The drink integrity locking unit 40 thus ensures that ideal drink quality and taste is maintained by limiting access to the flow control unit 60, especially by those who are not trained service technicians.

In a similar manner, the valve assembly 6 in FIG. 2 is further apportioned to include an inductor unit 80. The inductor unit 80 controls the flow of beverage fluid across the modular flow controller 1 via a coil assembly 90. In effect, the coil assembly 90 acts as a valve for discharging a desired quantity of beverage fluid 90.

Figure 3:
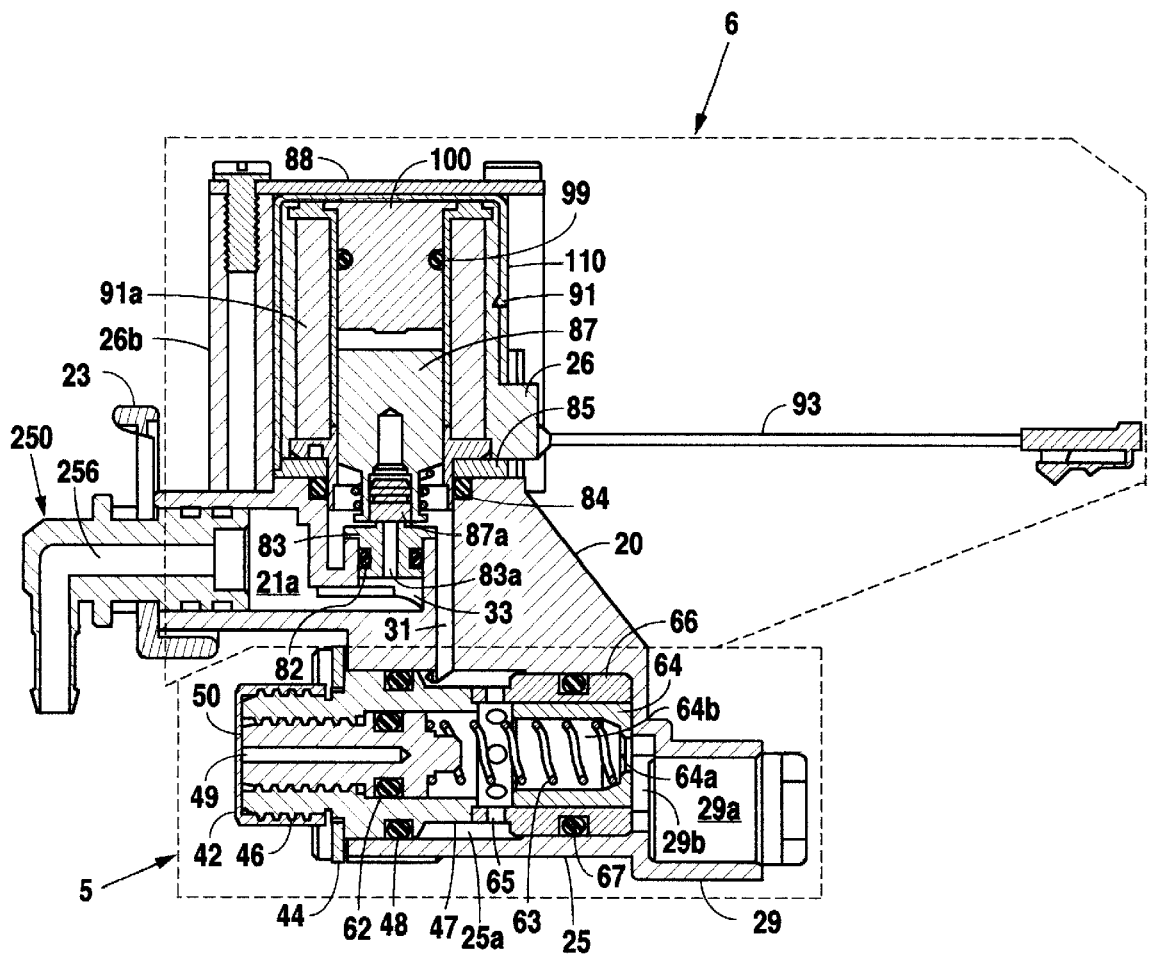
FIG. 3 is a cross-sectional side view illustrating a modular flow controller with a dispensing nozzle connector fitting secured thereto.

Specifically, as shown in FIGS. 1–3, the modular flow controller 1 includes a manifold 20 for supporting and operationally linking the flow control assembly 5 and the valve assembly 6. The manifold 20 includes a flow control body 25 for securing the flow control unit 60 and the drink integrity locking unit 40 thereto.

The flow control body 25 defines a flow control manifold chamber 25a. As such, the drink integrity locking unit 40 and the flow control unit 60 is disposed along the flow control manifold chamber 25a.

Figure 9:
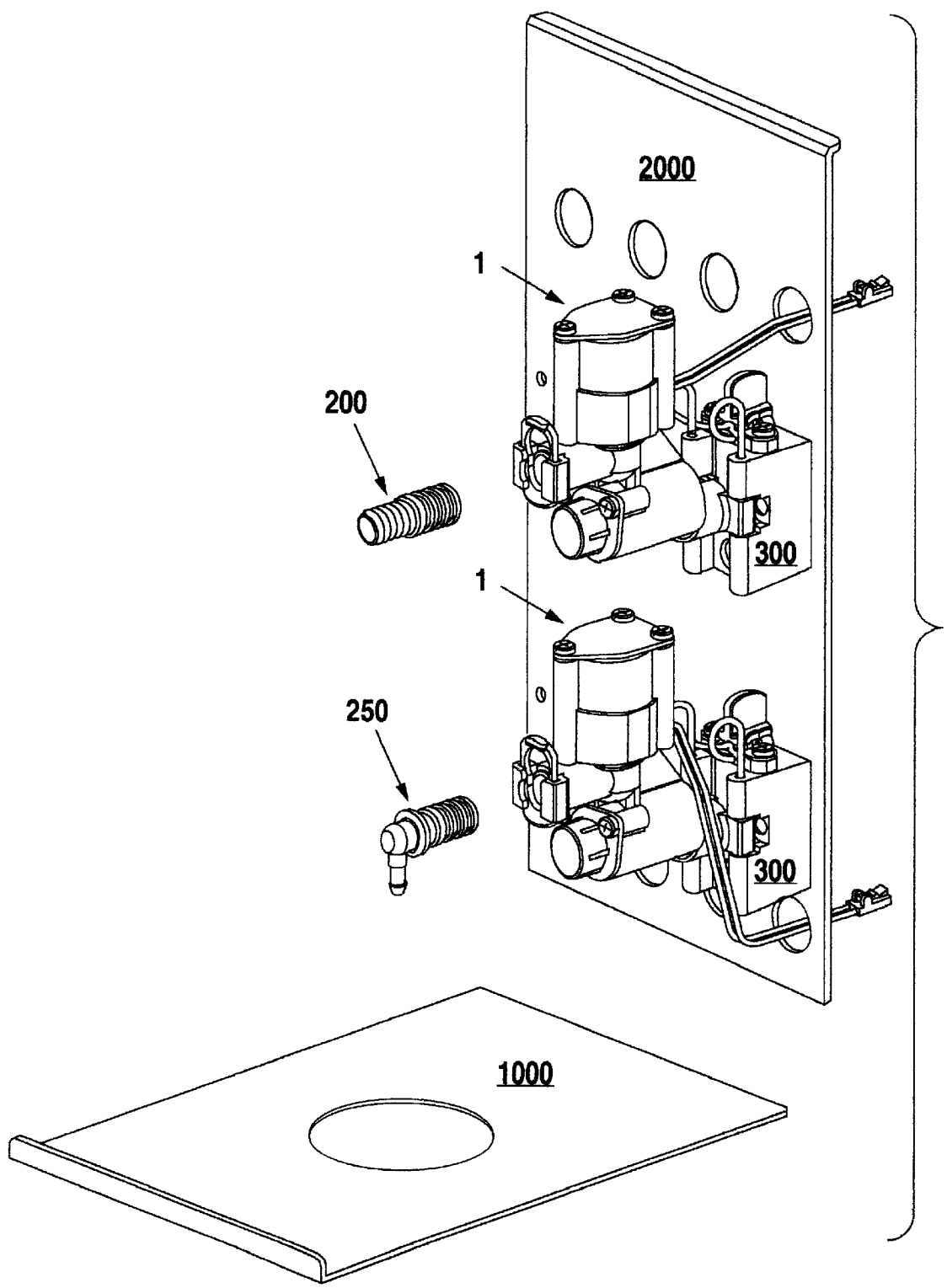
FIG. 9 is an exploded, isometric view featuring an array of modular flow controllers not directly attached to a faucet plate, thereby minimizing the overall size of the faucet plate.

Inasmuch, the flow control manifold chamber 25a is configured so that the flow adjustment interface 50 of the drink integrity locking unit 40 may readily receive input from a service technician with minimal obstruction from the modular flow controller 1 and from the dispensing valve assembly in general. For example, FIG. 9 shows each drink integrity locking unit substantially parallel with the horizontally aligned faucet plate as is preferred, thereby permitting access to one drink integrity locking unit with minimal obstruction from the other drink integrity locking units. Other embodiments contemplate each flow control interface positioned at an angle between 0° to about 89° with respect to the horizontally aligned faucet plate.

The flow control body 25 includes at least one anchoring member 25b for threadedly receiving a corresponding flow control screw 43. Although the anchoring member 25b is preferably configured to receive a screw, those of ordinary skill in the art will recognize that the anchoring member 25b can be configured to accommodate any means for attaching the drink integrity locking unit 40 and the flow control unit 60 along the flow control manifold chamber 25a.

The manifold 20 includes a manifold inlet 29, operatively linked with the flow control manifold chamber 25a and extending outwardly from the flow control body 25, for receiving beverage fluid from the beverage fluid line. As shown in FIG. 3, the manifold inlet 29 includes a manifold inlet passageway 29a, extending through the manifold inlet 29, for channeling beverage fluid through the manifold inlet 29. In the preferred embodiment, an inlet passageway 29b is provided between the manifold inlet passageway 29a and the flow control manifold chamber 25a, for restricting the amount of beverage fluid entering the flow control unit 60 in the flow control manifold chamber 25a.

In a similar manner, the manifold 20 includes a valve body 26 for securing the inductor unit 80 thereto. The valve body 26 defines a valve manifold chamber 26a. As such, the inductor unit 80 is disposed along the valve manifold chamber 26a.

The valve body 26 includes at least one anchoring member 26b for threadedly receiving a corresponding valve screw 89. Although the anchoring member 26b is preferably configured to receive a screw, those of ordinary skill in the art will recognize that the anchoring member 26b can be configured to accommodate any means for attaching the inductor unit 80 along the valve manifold chamber 26a.

The manifold 20 includes a manifold outlet 21, operatively linked with the valve chamber 26a and extending outwardly from the valve body 26, for discharging beverage fluid from the beverage fluid modular flow controller 1. As shown in FIG. 3, the manifold outlet 21 includes a manifold outlet passageway 21a, extending through the manifold outlet 21, for channeling beverage fluid through the manifold outlet 21.

The manifold inlet 29 and the manifold outlet 21 each are an improved design to facilitate connection with standard fittings or with a back block. Specifically, the manifold inlet 29, the manifold outlet 21, the manifold inlet passageway 29a, and the manifold outlet passageway 29b are each configured to accommodate back blocks or standard fluid carrying elements, such as standard fittings, couplings as well as beverage fluid lines.

Figure 5:
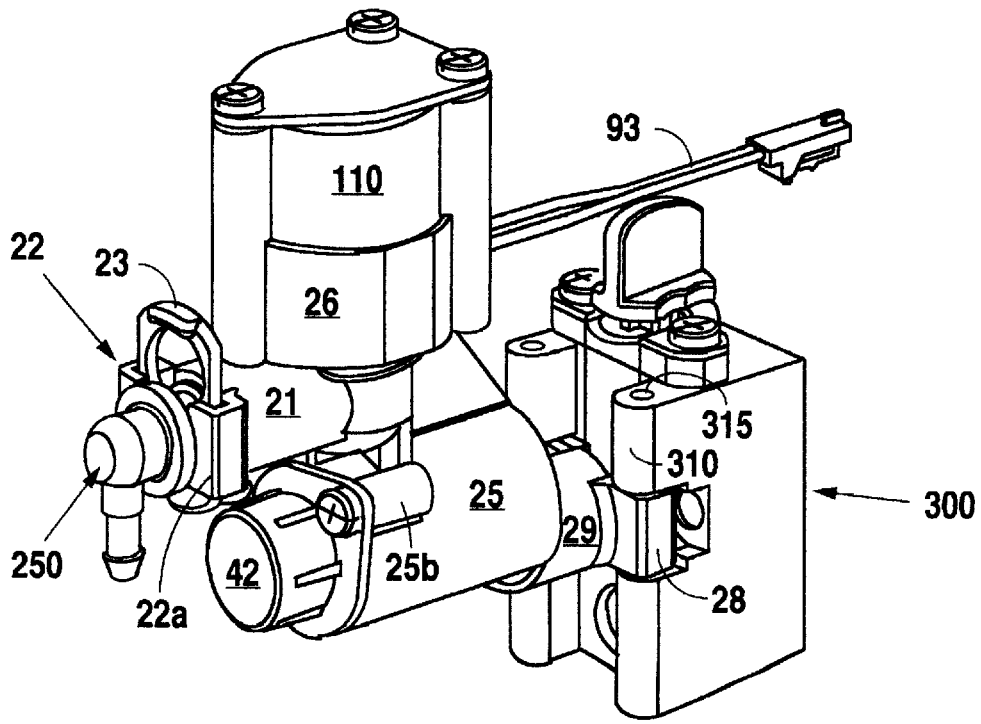
FIG. 5 is an isometric view illustrating a modular flow controller with a back block as well as a dispensing nozzle connector fitting, each operatively linked with the modular flow controller, whereby beverage fluid flows from the back block, across the modular flow controller, and through the nozzle connector fitting.

For example, as shown in FIGS. 3 and 5, the manifold outlet 21 is configured to accommodate a dispensing nozzle connector fitting 250 of a well known type. As such, the dispensing nozzle connector fitting 250 may be linked directly with the dispensing nozzle or to the faucet plate with the dispensing nozzle, depending on the configuration of the dispensing nozzle.

Figure 4:
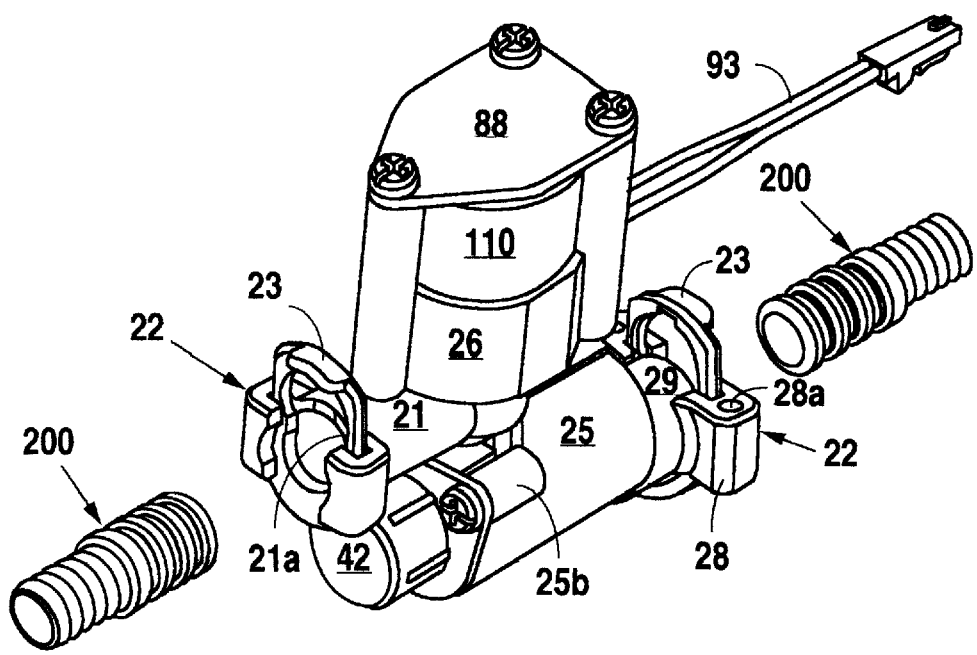
FIG. 4 is an exploded, isometric view illustrating a modular flow controller for receiving beverage fluid line couplings.

FIG. 4 provides a further example, wherein the manifold inlet 29 and the manifold inlet 21 are each configured to accommodate a beverage fluid line coupling 200. Each beverage fluid coupling 200, in turn, is linked with a respective beverage fluid line of a well known type, thereby enabling the modular flow controller to be positioned apart from the faucet plate so long as beverage fluid is discharged by the modular flow controller 1 to the dispensing nozzle.

In this manner, the manifold inlet 29 and the manifold outlet 21 are not required to be secured directly onto the faucet plate but can assume any spatial configuration to optimally minimize the size of the faucet plate so long as beverage fluid is discharged by the modular flow controller 1 to the dispensing nozzle at a desired quantity and flow rate. The modular flow controller 1 is hence "modular" in that it is not directly attached on the faucet plate as with current flow controllers.

Accordingly, FIG. 9 features an array of modular flow controllers 1 not directly attached to a faucet plate 1000. Inasmuch, the embodiment of FIG. 9, features a modular linking element 2000 for spatially orienting at least one modular flow controller to thus optimally minimize the size of the faucet plate 1000. Although the modular linking element 2000 of FIG. 9 is vertically oriented with respect to the faucet plate 1000, those of ordinary skill in the art will recognize other spatial configurations for the modular lining element 2000. Moreover, other embodiments contemplate orienting at least one modular flow controller apart from the faucet plate without a modular linking element, such as for example directing linking a modular flow controller with another.

The manifold inlet 29 may include a fitting lock 22 in cooperative engagement with the manifold inlet passageway 29a for ensuring that a fluid carrying element, such as a fitting, a coupling or a beverage fluid line, is properly secured to the manifold inlet 29. Similarly, the fitting lock 22 may also be included with the manifold outlet 21, in cooperative engagement with the manifold outlet passageway 21a, for ensuring that a fluid carrying element is properly secured to the manifold outlet 21. In particular, the fitting lock 22 includes a body 22a and a sliding element 23 in operative engagement with the body 22a for rendering a first position for abutting a fitting or beverage fluid line or rendering a second position for freeing that fitting or beverage fluid line.

As such, in FIG. 2, the sliding element 23 defines a freeing aperture 23a and an abutting aperture 23b cooperatively linked with and extending from the freeing aperture 23b. The freeing aperture 23b is so dimensioned that a fluid carrying element, such as for example a standard fitting or beverage fluid line, passes freely therethrough. Similarly, the abutting aperture 23b is so dimensioned that a fluid carrying element is in frictional engagement with the abutting aperture 23b, to thus secure the standard fitting or beverage fluid line to the body 22a.

Referring to the manifold inlet 29 in FIG. 5, the fitting lock 22 may also include back block interface element 28 extending from the body 22a for securing a back block 300 to the manifold inlet 29. The back block 300, in turn, is operatively linked with a respective beverage fluid line from the dispensing valve assembly. The back block 300 thus ensures that fluid pressure is maintained along that beverage fluid line while the dispensing valve assembly is removed, especially during cleaning or maintenance.

Figure 10:
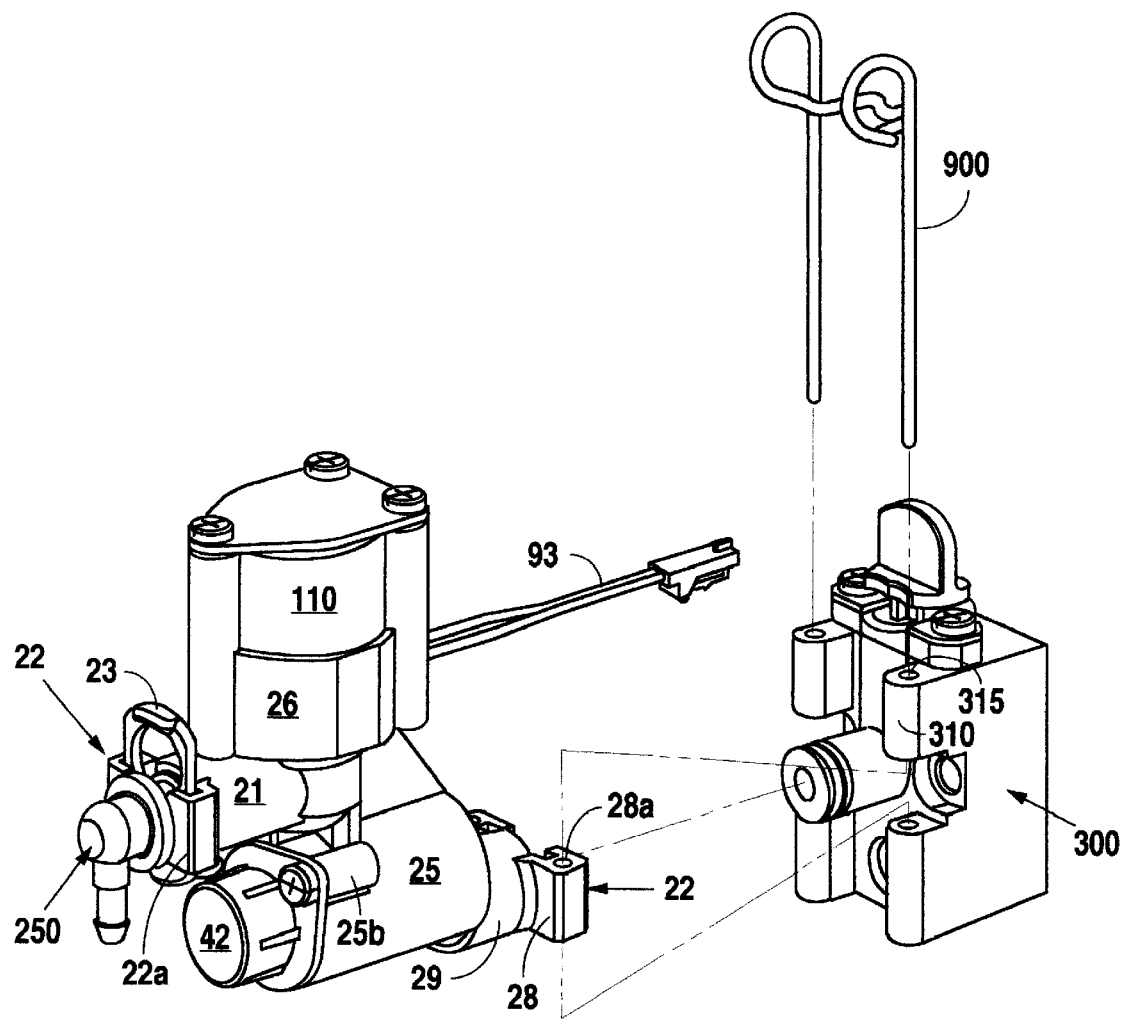
FIG. 10 is an exploded, isometric view illustrating a bracket for coupling the modular flow controller and the back block of FIG. 5.

In particular, the back block 300 preferably includes a flow controller interface element 310 extending from the back block 300 for engagement with the back block interface element 28. As illustrated in FIG. 10, the back block interface element 28 and the flow controller interface element 310 respectively include a back block interface element guide bore 28a and a flow controller interface element guide bore 315 for engagement with the back block interface element guide bore 28a. Operatively, the back block interface element 28 and the flow controller interface element 310 are aligned so that a bracket 900, see FIG. 10, passes through both the back block interface element guide bore 28a and the flow controller interface element guide bore 315, thereby coupling the back block 300 with the modular flow controller 1. It should be added that those of ordinary skill in the art will recognize other suitable coupling means for insertion through both the back block interface element guide bore 28a and the flow controller interface element guide bore 315, such as a pin.

Accordingly, FIG. 5 depicts the preferred manner for coupling the back block 300 with the modular flow controller 1. Because manifold 20 may accommodate standard fittings, as discussed above, the back block 300 along with the modular flow controller 1 can be positioned apart from the faucet plate, thereby optimally minimizing the size of the faucet plate. Moreover, especially in the case of coffee beverage dispensers, the modular flow controller 1 need not be coupled to a back block but can accommodate a fluid carrying element instead.

Figure 8:
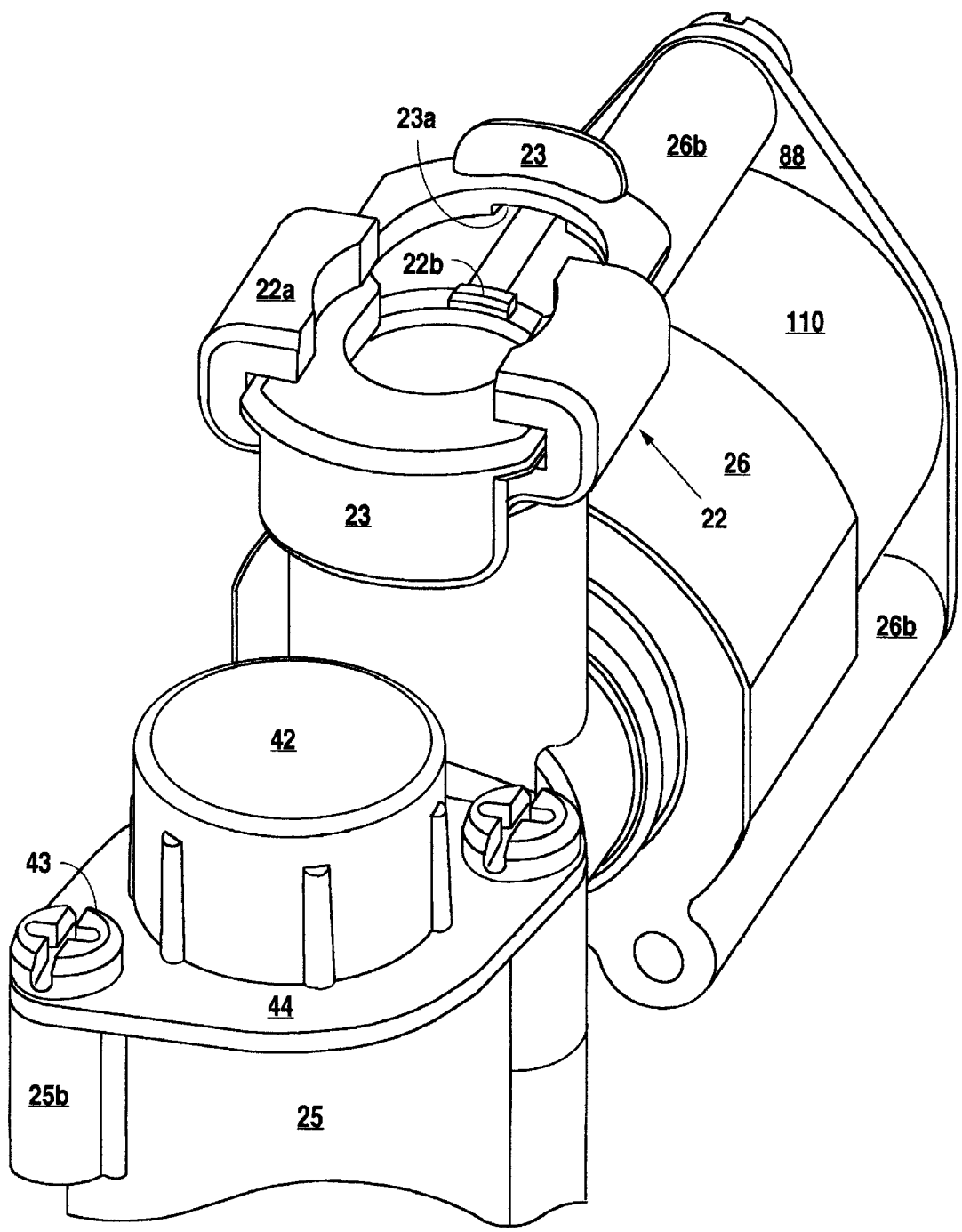
FIG. 8 is an isometric view illustrating a fitting lock according to the preferred embodiment featuring a holding rib and a corresponding holding groove for preventing a sliding element from extending away from the fitting lock.

It must also be said that the sliding element 23 is in releasable engagement with the fitting lock 22. For the preferred embodiment, the sliding element 23 is removed to facilitate favorable alignment with the back block 300. In particular, as shown in FIG. 8, the preferred fitting lock 22 includes a holding groove 22a disposed on the sliding element 23 for engagement with a corresponding holding rib 22b provided by the fitting lock 22 and, in the case of a modular flow controller, extending outwardly from either a flow control inlet or outlet.

As such, the holding rib 22b engages with the holding groove 22a, thereby preventing the sliding element 23 from unfavorably extending away from the fitting lock 22 when operatively in the first and second positions. However, to remove the sliding element 23 from the fitting lock 22, the sliding element 23 is rendered in a third position, whereby the holding rib 22b is forced out from the holding groove 22a to release the sliding element 23 from the first and second positions and, ultimately, from the fitting lock 22.

Conversely, other embodiments contemplate the holding groove 22a disposed on either a flow control inlet or outlet and the holding rib 22b disposed on the sliding element 23. Moreover, as those of ordinary skill in the art will recognize, the fitting lock 22 may be operatively engaged with other suitable beverage dispensing equipment, such as pumps, refrigeration lines as well as water or syrup supply lines.

Furthermore, as shown in FIG. 3, the manifold 20 defines a coupling channel 31 for directing beverage fluid from the flow control assembly 5 to the valve assembly 6, thereby operatively linking the flow control assembly 5 and the valve assembly 6. Similarly, in the preferred embodiment, the manifold defines an outlet passageway 33, extending from the flow controller outlet passageway 21a, for directing beverage fluid from the valve assembly 6 to the flow controller outlet 21. In operation, the outlet passageway 33 favorably restricts the flow rate and amount of beverage fluid entering the flow controller outlet passageway 21a.

As illustrated in FIGS. 2 and 3, the flow control unit 60 includes a control element 69 for establishing a desired flow rate as beverage fluid from the flow control inlet passes through the flow control assembly 5. Specifically, the control element 69 includes a piston 64 that pushes against beverage fluid entering the flow control manifold chamber 25a. In effect, the piston 64 dampens unfavorably high or low pressures associated with the incoming beverage fluid. The control element 69 further includes a diffuser sleeve 66 disposed about the piston 64 for establishing a desired flow rate. In the preferred embodiment, a plurality of diffuser outlets 65 are disposed about the diffuser sleeve 66 for facilitating a desired flow rate as beverage fluid passes from the flow control unit 60 to the coupling channel 31. Although the diffuser outlets 65 are preferred, those of ordinary skill in the art, however, will recognize other suitable means for establishing a desired flow rate.

The flow control unit 60 includes a flow control spring 63 linked with the piston 64, for resiliently supporting the piston 64 as the piston 64 dampens unfavorable pressures associated with the incoming beverage fluid. The flow control unit 60 further includes a seal 67 for supporting the control element 64 within the flow control manifold chamber 25a and for preventing unfavorable seepage of incoming beverage fluid traveling through the flow control manifold chamber 25a.

In operation, beverage fluid passes from the manifold inlet passageway 29a through the inlet passageway 29b to the control element 69 disposed within the flow control manifold chamber 25a. Beverage fluid then flows across a piston head inlet 64 and through a piston chamberway 64, each defined by the piston 64. Beverage fluid then exits from the control element 69 to the flow control manifold chamber 25a via the diffuser outlets 65 extending from the piston chamberway 64b through the piston 64, thereby establishing a desired flow rate. Accordingly, beverage fluid is directed from the flow control assembly 5 to the valve assembly 6 via the coupling channel 31 in fluid communication with the flow control manifold chamber 25a.

Figure 7:
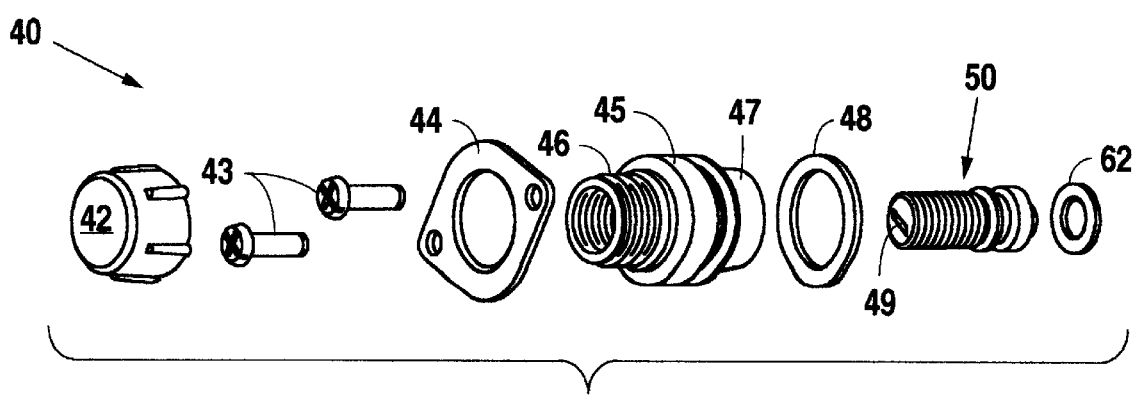
FIG. 7 is an exploded, isometric view of a drink integrity locking unit of the modular flow controller of FIG. 1 for maintaining a favorable fluid flow rate across the modular flow controller.

The drink integrity locking unit 40, in engagement with the flow control unit 60, is provided for ensuring that ideal drink quality and taste is maintained by limiting access to the flow control unit 60. As shown in FIGS. 3 and 7, the drink integrity locking unit 40 includes a flow adjustment interface 50 for selectively controlling the flow rate across the flow control unit 60 by varying the position the piston 64 within the flow control manifold chamber 25a. Inasmuch, the flow adjustment interface 50 is operatively linked with the flow control spring 63, thereby enabling the piston 64 to be displaced, via the flow control spring 63, as the flow adjustment interface 40 is displaced. In the preferred embodiment, the flow adjustment interface 40 includes an adjustment slot 49 for engagedly receiving a corresponding control input to favorably position and, thus, adjust the flow adjustment interface 45. In the preferred embodiment, the control input comprises an input from an adjustment tool (not shown), such as a screw driver or a wrench, although those of ordinary skill in the art will recognize other equivalent inputs, such as for example manual engagement.

The drink integrity locking unit 40 includes a drink integrity coupling 45 for engagedly receiving the flow adjustment interface 50 therein, whereby the flow adjustment interface 50 is selectively displaced within the drink integrity coupling 45. As shown in FIG. 7, the drink integrity coupling 45 and the flow adjustment interface 50 are each preferably threaded to facilitate accurate displacement of the flow adjustment interface 50 within the drink integrity coupling 45. A seal 62 is provided by the drink integrity locking unit 40, between the drink integrity coupling 45 and the flow adjustment interface 50, to prevent unfavorable seepage of beverage fluid therebetween. Moreover, as shown in FIG. 3, the drink integrity coupling 40 includes a flow control seat 47 extending outwardly therefrom for supporting the diffuser sleeve 66 within the flow control manifold chamber 25a.

Referring to FIG. 7, the drink integrity locking unit 40 includes a drink integrity lock 42 linked and in engagement with the drink integrity coupling 45 for restricting access to the adjustment slot 49 within the drink integrity coupling 45. As such, the preferred drink integrity coupling 45 includes a lock receiving element 46 extending outwardly therefrom for receiving the drink integrity lock 42.

FIG. 3 illustrates the preferred positioning of the drink integrity locking unit 40 so as to restrict access to the adjustment slot 49. From the drink integrity coupling 45 within the flow control manifold chamber 25a, the lock receiving element 46 extends outwardly from the flow control body 25. Thus, the drink integrity lock 42 is positioned on the lock receiving element 46 so that the drink integrity lock 42 is apart from but adjacent to the flow control body 25, thereby covering the adjustment slot 49 from view.

Although those of ordinary skill in the art will recognize other means for attaching the drink integrity lock 42 onto the drink integrity coupling 45, the drink integrity lock 42 and the lock receiving element 46 each preferably include threading for attaching the drink integrity lock 42 onto the lock receiving element 46. In sum, the drink integrity lock 42 covers the adjustment slot 49 from plain view, especially by untrained personnel who may unfavorably adjust the flow adjustment interface 50 on viewing the adjustment slot 49.

It should be added that a flow control unit retainer 44 is provided for ensuring that the drink integrity coupling 45 is favorably positioned within the flow control body 25. In particular, at least one flow control screw 43 passes through the flow control unit retainer 44 and is threadedly received by the corresponding anchoring member 25b. In effect, the flow control unit retainer 44 closes off the flow control manifold chamber 25a and, thus, encasing the flow control unit 60 and the drink integrity locking unit 40 therein.

Figure 6:
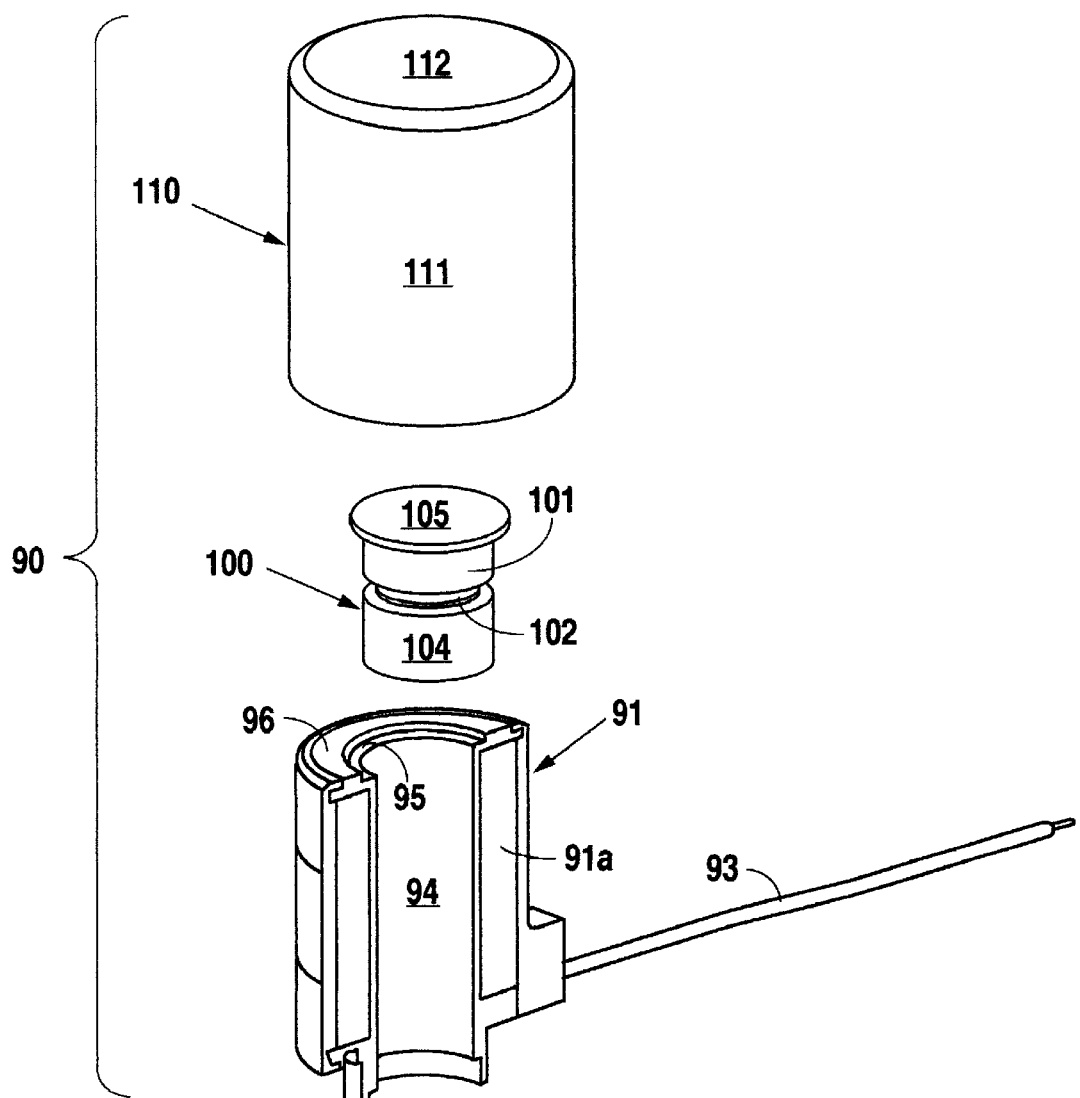
FIG. 6 is an exploded, isometric view of a coil assembly of the modular flow controller of FIG. 1 for discharging a desired quantity of beverage fluid from a dispensing valve assembly.

As illustrated in FIGS. 2, 3, and 6, the inductor unit 80 includes a plunger 87, disposed in the valve manifold chamber 26a and operatively linked with the coil assembly 90, for selectively restricting beverage fluid flow from the coupling channel 31 to the outlet passageway 33. Accordingly, in FIG. 2, the coil assembly 90 includes a coil element 91 and an actuator element 100 operatively linked with the coil element 91, whereby the coil element 91 and the actuator element 100 act in cooperation for selectively controlling the position of the plunger 87 to, thus, restrict beverage fluid flow. Referring to FIG. 6, the coil element 91 includes a plunger chamber 94 for receiving the plunger 87 as well as the actuator element 100.

Specifically, the coil element 91 includes electromagnetic inductor coils 91a disposed about the plunger chamber 94 for selectively engaging the actuator element 100. The electromagnetic inductor coils 91a are electrified, as needed by a beverage dispenser, via an electric coupling 93 linked thereto so as to impart an electromagnetic field and, thus, magnetize the actuator element 100. In the preferred embodiment, the actuator element 100 comprises an electromagnet of a well known type responsive to the electromagnetic field generated by the coil element 91. The actuator element 100, in turn, selectively imparts an electromotive force on the plunger 87, thereby restricting beverage fluid flow. It must be added that although the inductor unit 80 is preferably included with the valve assembly 6, those of ordinary skill in the art will readily recognize other suitable and equivalent means for manipulating the plunger 87 to restrict beverage fluid flow, such as, for example, through pneumatic, machine design, or thermodynamic principles.

The actuator element 100, includes an actuator wall 101 for contactedly engaging the plunger chamber 94. The actuator element 100 further includes an actuator retainment lip 105 extending outwardly from the actuator wall 101 for supporting the actuator wall 101 within the plunger chamber 94. The actuator element 100 may further include an actuator groove 102 disposed on the actuator wall 101 for receiving a corresponding seal 99 for restricting unfavorable beverage fluid flow about the actuator element 100.

Inasmuch, the coil element 91 includes an actuator interface member 96 to facilitate favorable positioning of the actuator element 100 within the plunger chamber 94. In particular, the actuator interface member 96 defines a retainment groove 95 for engagedly receiving the actuator retainment lip 105 to favorably position the actuator element 100 in the plunger chamber 94.

The coil assembly 90 further includes an inductor shroud 110 for housing as well as protecting the coil element 91 and the actuator element 100 from unfavorable environmental elements, such as water and dirt. The inductor shroud 110 includes a shroud top 112 and a shroud wall 111 extending downwardly from the shroud top 112.

A valve retainer 88 is provided by the inductor unit 80 for ensuring that the coil assembly 90 and the plunger 87 are favorably positioned within the valve body 26. In particular, at least one valve screw 89 passes through the valve retainer 88 and is threadedly received by the corresponding anchoring member 26b. In effect, the valve retainer 88 facilitates the coupling of the inductor shroud 110 to the valve body 26, thereby encasing the coil assembly 90 and the plunger 87 within the valve manifold chamber 26a.

As shown in FIG. 3, the coil assembly 80 includes a plug seat 83 disposed within the manifold 20 and in operative engagement with the plunger 87. The plug seat 83 defines a plug seat passageway 83a in fluid communication with the coupling channel 31 and the outlet passageway 33, whereby beverage fluid from the flow control assembly 5 flows from the coupling channel 31 across the plug seat passageway 83a through the outlet passageway 33. A seat seal 82 is provided between the plug seat 83 and the manifold 20 to prevent unfavorable beverage fluid flow therebetween so as to restrict fluid flow through the plug seat passageway 83a.

Accordingly, the plunger 87 includes a plug 87a for engagement with the plug seat passageway 83 to effectively establish a valve for restricting fluid flow from the coupling channel 31 to the plug seat passageway 83a. In the preferred embodiment, the plug 87a is composed of a sealant material, such as rubber or a synthetic polymer sealant.

In addition, the coil assembly 90 includes a plunger dampener 86 disposed about the plunger 87. In the preferred embodiment, the plunger dampener 86 comprises a spring. Operatively, the plunger dampener 86 resiliently maintains favorable displacement of the plunger 87 as the plunger 87 is attracted toward the magnetized actuator element 100. Thus, in a normally valve closed position, the plunger dampener 86 urges the plug 87a to close access through the plug seat passageway 83a. Conversely, in a valve open position, the plunger 87 is attracted toward the actuator element 100 causing the plug 87 to open access through the plug seat passageway 83a to permit fluid flow therethrough.

The coil assembly 90, in FIG. 3, further includes an encasing element 85 positioned substantially about the plunger chamber 94 and between the coil element 91 and the manifold 20. The encasing element 85 facilitates favorable positioning of the coil element 91 as well as facilitates the generation of a favorable electromagnetic field about the coil assembly 90. Moreover, the coil assembly 90 may include a coil assembly seal 84 positioned between the manifold 90 and the coil assembly 91 for preventing unwanted fluid flow from the coupling channel 31 to the coil assembly 90.

Operatively, in sum, beverage fluid enters the modular flow controller 1 from a beverage fluid line or a back block via the manifold inlet passageway 29. The flow rate of the beverage fluid is corrected while flowing from the manifold inlet passageway 29a to the flow control manifold chamber 25a. As such, beverage fluid flows from the manifold inlet passageway 29a across the piston head inlet 64a and the piston chamberway 64b, out the diffuser outlets 65, and collects about the flow control manifold chamber 25a. Beverage fluid then exits the flow control manifold chamber 25a and is directed through the coupling channel 31 to thereby engage with the plunger 87, via the plug 87a.

In the valve closed position, the normal position of the plunger 87, the plug 87a prevents continued fluid flow from the coupling channel 31 to the plug seat passageway 83a. In the valve open position, such as for example when a desired drink is required to be dispensed from a beverage dispenser, an electric current is sent through the coil element 91 so as to magnetize the actuator element 100. The actuator element 100, in turn, imparts an electromotive force on the plunger 87 causing the plug 87a to lift away from the plug seat 83, thereby exposing the plug seat passageway 83a to permit fluid flow from the coupling channel 31 through the plug seat passageway 83a.

Beverage fluid from the plug seat passageway 83a then flows from the outlet passageway 33 to the flow controller outlet passageway 21a. The flow control passageway 21a may receive either a fitting, such as a beverage fluid line coupling, a dispensing nozzle connector fitting or a beverage fluid line to facilitate beverage fluid discharge from the modular flow controller 1 at the flow controller outlet 21.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

We claim:

1. A modular flow controller for a beverage dispenser dispensing valve assembly, wherein the beverage dispenser dispensing valve assembly comprises a dispensing nozzle for discharging a desired beverage, a faucet plate for supporting the dispensing nozzle, and a beverage fluid line for delivering beverage fluids to the modular flow controller, the modular flow controller, comprising:
    a flow control assembly for establishing a desired flow rate, the flow control assembly, comprising:
        a flow control unit operatively linked and in fluid communication with the beverage fluid line,
        a flow adjustment interface rendered in a substantially horizontal position for receiving a control input to establish a desired flow rate, and
        a drink integrity locking unit in cooperative engagement with the flow control unit, the drink locking unit, comprising:
        a drink integrity coupling for engagedly receiving the flow adjustment interface, and
            a drink integrity lock operatively linked with the drink integrity coupling to prevent access to the flow adjustment interface; and
    a valve assembly in operational engagement with the flow control assembly for discharging a desired quantity of fluid from the modular flow controller.

2. The modular flow controller according to claim 1, further comprising:
    a manifold for operatively linking the flow control assembly and the valve assembly.

3. The modular flow controller according to claim 2 wherein the manifold is defined by the flow control assembly and the valve assembly.

4. The modular flow controller according to claim 2 wherein the manifold includes a coupling channel in fluid communication with the flow control assembly and the valve assembly for passing fluid therebetween.

5. The modular flow controller according to claim 2 wherein the manifold further comprises a manifold inlet in fluid communication with the beverage fluid line.

6. The modular flow controller according to claim 5 wherein the manifold inlet can accommodate a fluid carrying element.

7. The modular flow controller according to claim 6 wherein the fluid carrying element is in fluid communication with the manifold inlet, thereby enabling the modular flow controller to operate apart from the faucet plate.

8. The modular flow controller according to claim 5 wherein the manifold inlet can accommodate a back block.

9. The modular flow controller according to claim 8 further comprising a back block interface element extending from the manifold inlet for coupling the modular flow controller to a back block.

10. The modular flow controller according to claim 9 wherein the back block interface element enables the modular flow controller and the back block to operate in tandem and apart from the faucet plate.

11. The modular flow controller according to claim 2 wherein the manifold further comprises a manifold outlet for discharging fluid from the modular flow controller.

12. The modular flow controller according to claim 11 wherein the manifold outlet can accommodate a fluid carrying element.

13. The modular flow controller according to claim 12 wherein the fluid carrying element is in fluid communication with the manifold outlet, thereby enabling the modular flow controller to operate apart from the faucet plate.

14. The modular flow controller according to claim 1 wherein the flow control unit establishes a consistent beverage fluid flow rate amid varying flow pressures exerted by beverage fluid received from the beverage fluid line.

15. The modular flow controller according to claim 1 wherein the drink integrity locking unit includes an adjustment slot for receiving the control input thereon.

16. The modular flow controller according to claim 15 wherein the drink integrity lock covers the adjustment slot from view, thereby preventing access to the flow adjustment interface.

17. The modular flow controller according to claim 1 wherein the flow adjustment interface is substantially parallel with the faucet plate.

18. The modular flow controller according to claim 17 wherein the faucet plate is aligned horizontally with the ground.

19. The modular flow controller according to claim 1 wherein the valve assembly comprises an inductor unit for restricting fluid flow from the modular flow controller.

* * * * *